United States Patent

[11] 3,580,999

[72] Inventor Frank W. Mounts
Colts Neck, N.Y.
[21] Appl. No. 786,243
[22] Filed Dec. 23, 1968
[45] Patented May 25, 1971
[73] Assignee Bell Telephone Laboratories, Incorporated
Murray Hill, N.J.

[54] REDUNDANCY REDUCTION DATA COMPRESSOR WITH LUMINANCE WEIGHTING
5 Claims, 2 Drawing Figs.

[52] U.S. Cl. .................... 178/7.1
[51] Int. Cl. .................... H04n 7/12
[50] Field of Search .................... 178/7.1, 6.8, 6 (BWR); 325/427, 38; 179/15 (BWR), 15.55; 332/11

[56] References Cited

UNITED STATES PATENTS 2,681,385 6/1954 Oliver .................... 178/6BWR
3,225,333 12/1965 Vinal .................... 179/15.55
3,333,056 7/1967 Pratt .................... 178/6.8
3,324,237 6/1967 Cherry et al. .................... 179/15.55

*Primary Examiner*—Richard Murray
*Assistant Examiner*—Alfred H. Eddleman
*Attorneys*—R. J. Guenther and E. W. Adams, Jr.

ABSTRACT: A redundancy reduction data compressor is described for processing a video signal having time subintervals called frames, the amplitude level of which signal is an indication of the luminance level in a scene being viewed. An entire frame of samples from the signal is stored in a frame memory. Each new sample from the signal is compared with its corresponding stored sample having the same time position within the frame. If the new sample is found to differ from the stored sample by more than a threshold level, the new sample is stored in a buffer memory to await transmission over a transmission channel. The threshold level is a function of the luminance level of the new sample and number of samples stored in the buffer memory, such that a sample from the high brightness region of the picture and/or a larger number of samples in the buffer memory result in a larger threshold level.

INVENTOR
F. W. MOUNTS
BY Daniel D. Dubosky
ATTORNEY

REDUNDANCY REDUCTION DATA COMPRESSOR WITH LUMINANCE WEIGHTING

BACKGROUND OF THE INVENTION

This invention relates to redundancy reduction type data compressors and more particularly to redundancy reduction data compressors utilized to process video signals.

In my copending application, Ser. No. 749,770, filed Aug. 2, 1968 and entitled "Redundancy Reduction System for Video Signals" the number of samples required to be transmitted from a video signal to a remote receiving location is reduced by generally transmitting only those samples which represent a video amplitude change in a picture element, or spatial point in a picture, from one video frame to the next. In this type of system, an entire frame of video samples is stored in a frame memory. Each new sample from the video signal is compared with the sample stored in the frame memory having the same time position in a video frame. If the new sample is found to differ from the stored sample by more than a threshold level, the new sample is transmitted to the receiving location. If the threshold is increased, fewer samples are transmitted for any given changing scene being viewed. An upper limit on the threshold is set however, by a subjectively annoying effect which is introduced as the threshold is increased. This effect appears to the viewer as noise superimposed on the picture giving the appearance that the subject of the scene is being viewed through a dirty window. It has been observed that this annoying effect is more observable in the low brightness regions of video than in the high brightness regions. Accordingly, it is the low brightness regions of the video picture which tend to set the upper limit on the threshold value which may be used in a system of the type found in my above-Identified copending application.

Where the new samples are to be transmitted at a constant rate over a transmission facility, each new sample judged to be significantly different so as to warrant transmission is stored in a buffer memory since the samples to be transmitted occur at a random rate. To prevent overflow and underflow of this buffer memory the threshold level is caused to be a function of the number of samples stored in the buffer memory. As more and more samples are stored in the buffer memory, the threshold level is caused to increase in value thereby decreasing the number of samples extracted from the video signals which are to be transmitted to the receiving location. Even with this variable threshold level, however, it is the low brightness regions of the picture which tend to establish both the threshold function and size of the buffer memory based on the subjectively annoying effects introduced by too high a threshold level.

SUMMARY OF THE INVENTION

A primary object of the present invention is to further reduce the number of samples which must be transmitted in a redundancy reduction data compressor of the type which transmits a sample only when it differs significantly from a sample corresponding to the same spatial point in a previous video frame. This object and others are achieved in apparatus constructed in accordance with the present invention wherein each new sample from a video signal is compared with a corresponding sample from a frame memory having the same time position in a video frame to produce a difference signal whose value is equal to the absolute magnitude of the difference between the new sample and the stored sample. This difference signal is compared with a threshold level in order to determine whether the new sample is sufficiently different so as to warrant transmission to the receiving location. In accordance with the present invention the threshold level is not only a function of the number of words stored in a buffer memory, but is also a function of the video signal amplitude or luminance level of the new sample. For video signal amplitude levels corresponding to high brightness levels, the threshold level is caused to be effectively higher in value so as to require samples from the high brightness regions to have greater changes before their transmission is considered to be warranted.

BRIEF DESCRIPTION OF THE DRAWING

The invention will be more readily understood when the following detailed description is read in conjunction with the drawing in which.

DETAILED DESCRIPTION

Figure 1:
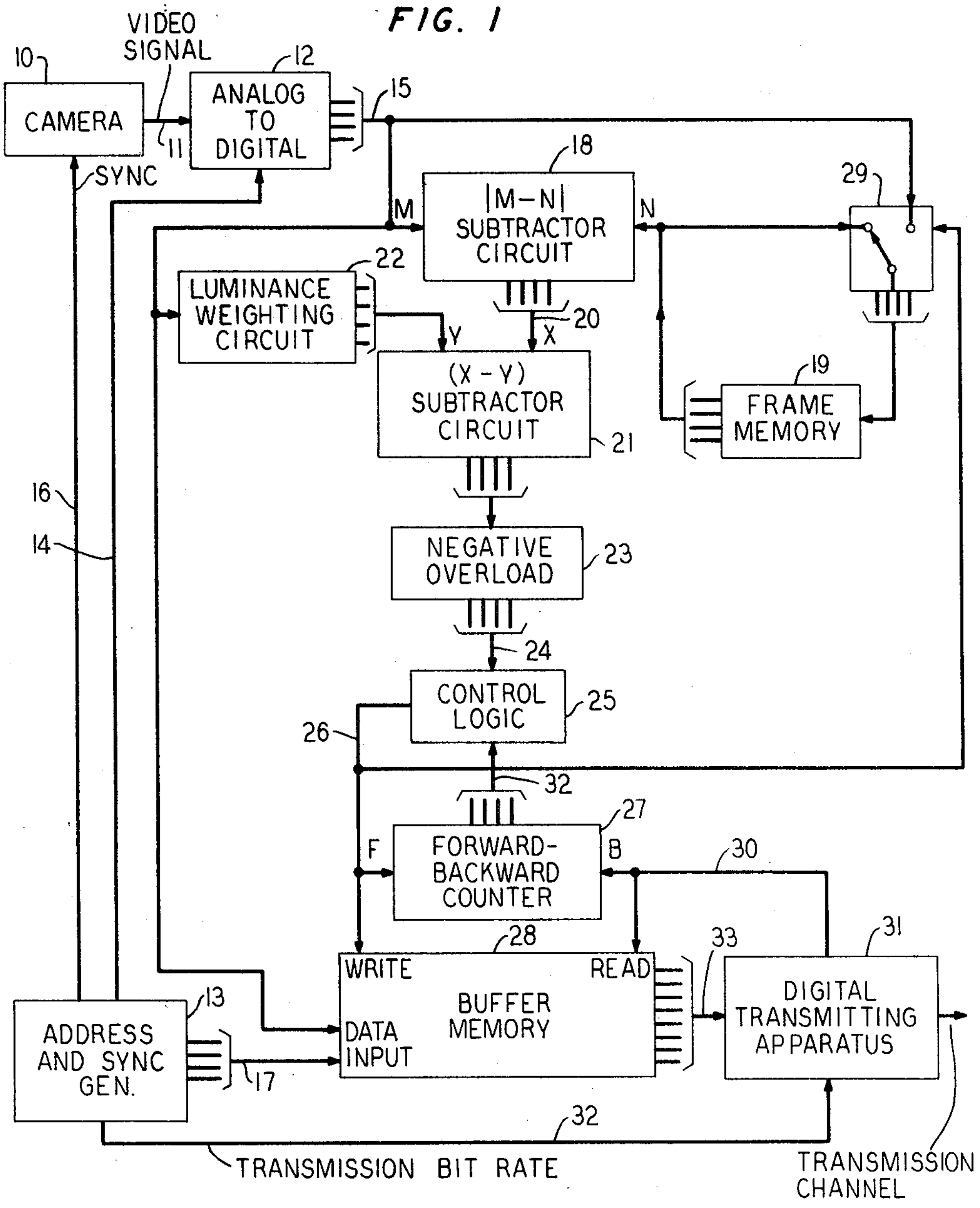
FIG. 1 is a schematic block diagram of one embodiment of a redundancy data compressor constructed in accordance with the present invention.

In FIG. 1, a camera 10 containing a camera tube such as a vidicon, provides a video signal on line 11 to an analog-to-digital converter 12. Analog-to-digital converter 12 samples the amplitude of the video signal on line 11 in response to an energizing pulse on line 14 and provides, on bus 15, a digital word having a value which represents the amplitude for each sampling. Here, as in all of the specification to follow, the term bus is utilized to designate several transmission paths in parallel, each one of which contains a different bit of the same digital word said to be carried by the bus.

It is assumed, here, that all of the digital words representing an entire frame of video signal samples have been previously stored in a frame memory 19. As will be appreciated by those skilled in the art after reading the remainder of the description, this storage of an entire frame of video signal samples will occur after the first frame has occurred at the output of camera 10. A subtractor circuit 18 determines the absolute magnitude of the difference between the digital word on bus 15 and a digital word from frame memory 19, the latter word having the same spatial point or picture element location in the video frame as the digital word on bus 15. A digital word representing the absolute magnitude of the difference thereby obtained in subtractor circuit 18 is coupled by way of bus 20 to one input ($x$) of a subtractor circuit 21.

Bus 15 is also connected to the input of a luminance weighting circuit 22. As indicated hereinabove the value of each digital word on bus 15 is a measure of the luminance represented by the video signal on line 11 during the sampling by analog-to-digital converter 12. In the present embodiment samples which result in a large valued digital word on bus 15 will be assumed to correspond to a high brightness level. The invention is in no way dependent on this relationship however, and is equally applicable to video signals for which high amplitude level corresponds to a low brightness level or dark region of the picture.

Figure 2:
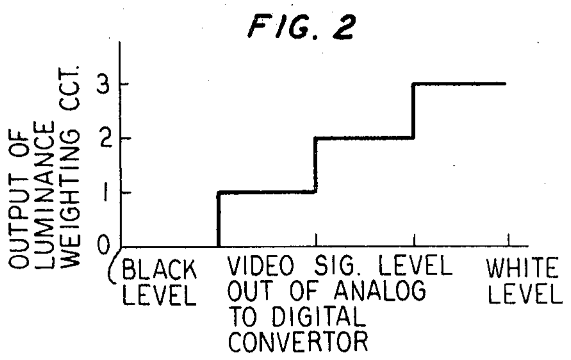
FIG. 2 is a curve showing the input-output relationships for the luminance weighting circuit shown as a block in FIG. 1.

The input-output relationship for the luminance weighting circuit 22 is indicated by the curve in FIG. 2. The abscissa in FIG. 2 is determined by the value of the digital word on bus 15 and is designated in FIG. 2 in terms of the video signal amplitude level represented by the digital word out of the analog-to-digital converter 15. In accordance with our above-stated assumption, the abscissa having the lowest value will be produced by a video sample from the black region of the video scene being viewed by camera 10 whereas the abscissa having the largest value will be produced by a video sample from the white region of the video scene. The ordinate of the curve in FIG. 2 represents the value of the digital word produced by weighting circuit 22 at its output in response to the digital word on bus 15. As is evident from FIG. 2, the output of circuit 22 is a monotonically increasing function of the input video signal luminance level, that is, a sample from the high brightness region of the picture results in larger output from circuit 22 than a sample from the low brightness region of the picture.

The other input ($y$) of subtractor circuit 21 is connected to the output of luminance weighting circuit 22. Hence subtractor circuit 21 produces at its output a modified difference digital word whose value is equal to the value of the difference provided by subtractor circuit 18 minus the value of the digital word produced by luminance weighting circuit 22. For a difference out of subtractor circuit 18 which resulted from a sample in the low brightness region of video near black, the value of the difference from circuit 18 is unaltered since the output of the weighting circuit 22 is equal to zero as indicated in FIG. 2. A difference out of subtractor circuit 18 which resulted from a sample in the high brightness region of video near white, however, is altered or modified so as to be decreased in value by the maximum amount since the output of the weighting circuit 22 for this type sample is at a maximum. In essence the value of the difference from subtractor circuit 18 is luminance weighted by the action of luminance weighting circuit 22 and subtractor circuit 21.

The modified or luminance weighted difference signal at the output of subtractor circuit 21 is coupled to the input of negative overload circuit 23. In some instances, the value of the difference from subtractor circuit 18 can be less than the value of the output from luminance weighted circuit 22. In these cases, subtractor circuit 21 produces a negative difference word at its output. Negative overload circuit 23 in response to a negative digital word at its input produces a digital word equivalent to zero at its output. For zero and all positive values of digital word at its input, negative overload circuit 23 passes the input digital word to its output without introducing any change in value.

The luminance weighted digital word at the output of negative overload circuit 23 is coupled by way of bus 24 to one input of a control logic circuit 25. If this difference on bus 24 represents a significant change, that is that the difference has exceeded a threshold level as determined by control logic circuit 25, an energizing signal is provided by the latter on line 26. An energizing signal on line 26 is coupled to the write input of a buffer memory 28, to the forward input of a forward-backward counter 27 and to the energizing input of a single-pole double-throw circuit 29. Activation of circuit 29 causes the input of frame memory 19 to be connected directly to bus 15 from analog-to-digital converter 12. As a result, an energizing signal on line 26 causes the digital word on bus 15 representing the significant change which resulted in the energizing signal to be written into buffer memory 15 and in addition to be inserted in place of its corresponding previously stored word into frame memory 19.

The determination by control circuit 25 as to whether or not the difference word on bus 24 represents a significant change (i.e. a change which exceeds the threshold level) is a function of the number of words stored in buffer memory 28. Each time that an energizing signal is presented on line 26 and a digital word from bus 15 is written into buffer memory 28, the forward input of forward-backward counter 27 is energized and the count therein is advanced by one. The backward input of forward-backward counter 27 is connected to the read input of buffer memory 20 which in turn is energized by a pulse on line 30 from a digital transmitting apparatus 31. Hence, the digital word available at the output of forward-backward counter 27 on bus 32 is equal in value to the number of samples stored in buffer memory 28. This digital word on bus 32 is coupled to an input of control logic circuit 25.

Generally, the more samples which are stored in buffer memory 28, the larger the difference must be on bus 24 before control logic circuit 25 produces an energizing signal on line 26. In this way, overflow of buffer memory 28 is restrained. When there are fewer than a predetermined number of samples in buffer memory 28, the control circuit 25 is designed to provide an energizing signal on line 26 even though the digital word on bus 24 representing the luminance weighted difference is zero, that is, even though no significant change is indicated. In this way buffer memory underflow is prevented.

An address and sync generator 13, in addition to providing the above-mentioned energizing pulse on line 14, also provides with each such pulse a digital word on bus 17 representing the address or spatial point location of the digital word on bus 15 within the video frame. To maintain synchronization, that is to insure that each digital word on bus 17 will continue to correspond to the same spatial point or picture element within the video frame, sync signals are provided on line 16 from address and sync generator 13 to camera 10. This synchronization may of course also originate in camera 10 rather than generator 13 as in the present embodiment.

The address word provided by generator 13 on bus 17 is coupled into buffer memory 28 along with its corresponding digital word from bus 15 each time that the write input of buffer memory 28 is energized. This digital word from bus 15 and address word from bus 17 form one complete sample or addressed digital word in buffer memory 28.

Samples are written into buffer memory 28 at a random rate dependent primarily on the picture statistics of the scene being viewed. Digital transmitting apparatus 31 reads the samples or addressed digital words out of buffer memory 28 at a constant rate by providing energizing pulses to the read input of buffer memory 28 via line 30. The addressed digital words thereby provided to the input of digital transmitting apparatus 31 via bus 33 are converted by the latter into a serial bit stream for transmission over a transmission channel to a receiving location. The transmission bit rate in apparatus 31 is established in the present embodiment by pulses provided on line 32 by address and sync generator 13.

While a particular embodiment of the invention has been described in detail many further variations may be employed without departing from the spirit and scope of the present invention.

I claim:

1. In a redundancy reduction data compressor for use with samples from a video signal having time subintervals called frames, the amplitude of each sample being an indication of luminance level in said video signal, a combination comprising frame storage means for storing an entire frame of video samples each one of which has a particular location in a video frame, means for developing a signal which is a function both of the difference between a new sample and its corresponding sample in said frame storage means and of the luminance level of said new sample, means for developing a threshold level and means responsive to the developed signal and to said threshold level for transmitting said new sample when the developed signal exceeds said threshold level.

2. In a combination as defined in claim 1 wherein said means for developing a signal includes a subtractor circuit for developing an absolute magnitude of the difference between said new sample and said corresponding sample in said frame storage means, and means for decreasing said absolute magnitude of the difference by an amount which increases in accordance with the luminance level of said new sample.

3. In a combination as defined in claim 2 wherein said means for decreasing said absolute magnitude of the difference includes a second subtractor circuit having an output and two inputs one of which is connected to receive said absolute magnitude of the difference, and a luminance weighting circuit having its input connected to receive said new sample and its output connected to the other input of said second subtractor circuit, the output of said luminance weighting circuit being a monotonically increasing function of the luminance level of said new sample.

4. A redundancy reduction data compressor for use with samples from a video signal having time subintervals called frames, the amplitude of each sample being an indication of luminance level in said video signal, said data compressor comprising frame memory means for storing an entire frame of video samples each one of which has a particular location in a video frame, means for developing a difference signal whose value is equal to the difference between a new sample and its corresponding sample in said frame memory means, a buffer memory means for storing selected samples, means for counting the number of samples stored in said buffer memory means, and means responsive to the luminance level of said new sample and to the number of samples stored in said buffer memory means for selecting said new sample for storage in said buffer memory means if said difference signal exceeds a threshold level, the threshold level being a function of the luminance level of said new sample and of the number of samples stored in said buffer memory means.

5. A redundancy reduction data compressor as defined in claim 4 wherein said means for selecting said new sample for storage in said buffer memory means includes a luminance weighting circuit having its input connected to receive said new sample to provide at its output a signal whose magnitude is a monotonically increasing function of the luminance level of said new sample, and means for subtracting the output signal of said luminance weighting circuit from the developed difference signal to produce a modified difference signal.